United States Patent
Mishra et al.

(10) Patent No.: US 7,801,841 B2
(45) Date of Patent: Sep. 21, 2010

(54) METHOD, SYSTEM AND SOFTWARE ARRANGEMENT FOR RECONSTRUCTING FORMAL DESCRIPTIVE MODELS OF PROCESSES FROM FUNCTIONAL/MODAL DATA USING SUITABLE ONTOLOGY

(75) Inventors: Bhubaneswar Mishra, Great Neck, NY (US); Marco Antoniotti, New York, NY (US); Naren Ramakrishnan, Blacksburg, VA (US)

(73) Assignee: New York University, New York, NY (US)

( * ) Notice: Subject to any disclaimer, the term of this patent is extended or adjusted under 35 U.S.C. 154(b) by 1080 days.

(21) Appl. No.: 11/471,913

(22) Filed: Jun. 20, 2006

(65) Prior Publication Data

US 2008/0147382 A1    Jun. 19, 2008

Related U.S. Application Data

(60) Provisional application No. 60/692,410, filed on Jun. 20, 2005.

(51) Int. Cl.
    *G06N 7/00*    (2006.01)
(52) U.S. Cl. .............. 706/55; 706/45; 706/46; 706/56; 706/57; 706/58; 706/62
(58) Field of Classification Search .......... 706/45–46, 706/55–58, 60, 62; 707/1–3; 702/1, 19–21
    See application file for complete search history.

(56) References Cited

U.S. PATENT DOCUMENTS

| | | | |
|---|---|---|---|
| 4,866,635 A * | 9/1989 | Kahn et al. | 706/46 |
| 7,574,409 B2 * | 8/2009 | Patinkin | 706/12 |
| 2006/0031217 A1 * | 2/2006 | Smith et al. | 707/5 |
| 2006/0053135 A1 * | 3/2006 | Beaumont et al. | 707/101 |
| 2006/0167827 A1 * | 7/2006 | Asahara | 706/55 |
| 2006/0179074 A1 * | 8/2006 | Martin et al. | 707/102 |

(Continued)

FOREIGN PATENT DOCUMENTS

WO    WO 2005/022412    *    8/2004

OTHER PUBLICATIONS

Fakrudin et al., "Genetic Variation of Cotton Bollworm, Helicoverpa Armigera (Hubner) of South Indian Cotton Ecosystem Using RAPD Markers" Dec. 2004, pp. 1654-1657.*

(Continued)

*Primary Examiner*—Donald Sparks
*Assistant Examiner*—Omar F Fernandez Rivas
(74) *Attorney, Agent, or Firm*—Dorsey & Whitney LLP

(57) ABSTRACT

A method, system and software arrangement in accordance with an exemplary embodiment of the present invention are provided to extract descriptive narrative from numerical experimental data augmented with ontological controlled vocabulary. One exemplary application of such system, method and software arrangement is in organizing gene-expression time course data in terms of biological processes that may be activated and deactivated as the biological system responds to its normal or perturbed environment. The present invention may also have biological applications to drug-or-vaccine discovery, understanding behavior of a cell in an altered diseased state (e.g., cancer, neuro-degeneration or auto-immune disease, etc.), genetically modifying a natural wild-type organism, genetic-engineering, etc. Other exemplary applications may include understanding neural behavior, market behavior of a population of users interacting on the Internet, etc.

33 Claims, 5 Drawing Sheets

U.S. PATENT DOCUMENTS

2006/0234244 A1* 10/2006 Kim et al. .................... 435/6
2006/0248045 A1* 11/2006 Toledano et al. .............. 707/2
2007/0168135 A1* 7/2007 Agarwal et al. ............... 702/19

OTHER PUBLICATIONS

Naren Ramakrishnan et al., "Reconstructing Formal Temporal Logic Models of Cellular Events using the GO Process Ontology" Dept. of Computer Science, Virginia Tech, Courant Inst. of Mathematical Sciences, New York University, 2005, pp. 1-2.

Paul T. Spellman et al., "Comprehensive Identification of Cell Cycle-regulated Genes of the Yeast Saccharomyces cerevisiae by Microarray Hybridization ▯D" Molecular Biology of the Cell vol. 9, Dec. 1998, pp. 3273-3297.

* cited by examiner

METHOD, SYSTEM AND SOFTWARE ARRANGEMENT FOR RECONSTRUCTING FORMAL DESCRIPTIVE MODELS OF PROCESSES FROM FUNCTIONAL/MODAL DATA USING SUITABLE ONTOLOGY

CROSS-REFERENCE TO RELATED APPLICATION

The present application claims priority to U.S. Provisional Application Ser. No. 60/692,410 filed Jun. 20, 2005, the disclosure of which is incorporated by reference herein in its entirety.

STATEMENT REGARDING FEDERALLY SPONSORED RESEARCH

The present invention was developed, at least in part, using Government support under Contract No. F30602-01-2-0556 awarded by the Defense Advanced Research Project Agency. Therefore, the Federal Government may have certain rights in the invention.

FIELD OF THE INVENTION

The present invention relates generally to methods, systems and software arrangements for reconstructing formal descriptive models of processes from functional/modal data using a particular ontology or a controlled vocabulary.

COMPUTER PROGRAM LISTING AND RELATED INFORMATION/DATA APPENDIX

Attached herewith, as an Appendix, please find two (2) copies of the source code, tables, data and information associated with the source code on CD-R disks. The entire disclosure provided therein is hereby incorporated by reference. The CD-R disks provided in the disclosure comply with the requirements set forth in 37 C.F.R. §§1.52(e), 1.77(b)(4), and 1.96. The attached CD-R disks (COPY 1 and COPY 2) contain the following files, the last modified date of each file, and size associated therewith.

| Name | Modified | Size | Ratio | Packed | Path |
|---|---|---|---|---|---|
| goalie-init | 1/7/2005 1:34 PM | 1,342 | 71% | 387 | goa... |
| cluster-datastructure.lisp | 6/10/2005 10:56 AM | 14,143 | 81% | 2,637 | goa... |
| registration.xml | 2/23/2005 8:36 PM | 612 | 45% | 334 | ...\Bi |
| goalie-ids-package.lisp | 5/19/2005 5:15 PM | 336 | 30% | 234 | goa... |
| goalie-pkg.lisp | 1/6/2005 2:59 PM | 234 | 22% | 182 | goa... |
| goalie.lisp | 5/19/2005 5:20 PM | 15,089 | 78% | 3,335 | goa... |
| goalie.system | 6/8/2005 1:55 PM | 3,021 | 78% | 650 | goa... |
| cluster-accessions-view.lisp | 5/25/2005 5:26 PM | 7,513 | 84% | 1,229 | ...\gui |
| cluster-plots.lisp | 6/10/2005 3:45 PM | 1,330 | 69% | 417 | ...\gui |
| clustering-experiments-displays.lisp | 12/28/2004 2:23 PM | 677 | 60% | 273 | ...\gui |
| edges-test.lisp | 6/1/2005 1:35 PM | 575 | 50% | 285 | ...\gui |
| elements-tree-view.lisp | 12/28/2004 6:21 PM | 8,202 | 81% | 1,520 | ...\gui |
| file-menu.lisp | 6/10/2005 10:57 AM | 11,632 | 78% | 2,525 | ...\gui |
| go-databases-menu.lisp | 1/6/2005 2:13 PM | 3,029 | 76% | 714 | ...\gui |
| goalie-cansole-interface.lisp | 5/17/2005 5:16 PM | 1,032 | 58% | 434 | ...\gui |
| goalie-database-setup-interface.lisp | 1/7/2005 1:27 PM | 3,873 | 78% | 852 | ...\gui |
| goalie-gui.system | 5/19/2005 12:43 PM | 980 | 67% | 320 | ...\gui |
| goalie-user-interface-20041228.lisp | 12/28/2004 10:43 AM | 5,893 | 71% | 1,685 | ...\gui |
| goalie-user-interface-common.lisp | 5/19/2005 2:49 PM | 2,255 | 65% | 785 | ...\gui |
| goalie-user-interface-functions.lisp | 6/10/2005 12:58 PM | 2,287 | 74% | 593 | ...\gui |
| goalie-user-interface.lisp | 6/10/2005 12:55 PM | 9,559 | 76% | 2,297 | ...\gui |
| graph-view-common.lisp | 5/12/2005 3:58 PM | 1,519 | 78% | 340 | ...\gui |
| graph-view-displays.lisp | 5/19/2005 5:02 PM | 11,816 | 85% | 1,772 | ...\gui |
| graph-view-inerface.lisp | 5/18/2005 6:03 PM | 10,686 | 84% | 1,691 | ...\gui |
| help-menu.lisp | 1/4/2005 12:59 PM | 3,699 | 75% | 936 | ...\gui |
| image-diaplay-panel.lisp | 12/11/2004 4:30 PM | 5,702 | 70% | 1,700 | ...\gui |
| images-interface.lisp | 12/9/2004 10:55 PM | 5,068 | 70% | 1,515 | ...\gui |
| progress-dialog.lisp | 2/16/2005 2:58 PM | 2,514 | 73% | 687 | ...\gui |
| redescription-panel.lisp | 12/9/2004 8:24 PM | 253 | 43% | 143 | ...\gui |
| start-gui.lisp | 6/10/2005 1:50 PM | 4,338 | 77% | 982 | ...\gui |
| test-hiding-interface.lisp | 12/28/2004 9:44 AM | 2,268 | 72% | 627 | ...\gui |
| time-course-redescription-dlg.lisp | 6/8/2005 4:33 PM | 1,344 | 60% | 539 | ...\gui |
| tools-menu.lisp | 6/8/2005 3:29 PM | 6,711 | 76% | 1,615 | ...\gui |
| venn-display.lisp | 5/19/2005 4:32 PM | 5,884 | 75% | 1,497 | ...\gui |
| web-access.lisp | 5/19/2005 2:48 PM | 2,138 | 64% | 761 | ...\gui |
| windowed-experiment-setup-functions.lisp | 12/27/2004 7:43 PM | 1,078 | 73% | 287 | ...\gui |
| windowed-experiment-setup.pane.lisp | 12/28/2004 6:17 PM | 3,096 | 70% | 917 | ...\gui |
| installation | 4/25/2005 3:15 PM | 4,689 | 52% | 2,241 | goa... |
| locuslink-associations.lisp | 12/2/2004 8:58 PM | 4,988 | 80% | 994 | goa... |
| raw-data.lisp | 3/13/2005 4:49 PM | 1,978 | 63% | 725 | goa... |
| Readme | 4/25/2005 3:15 PM | 244 | 20% | 194 | goa... |
| redescription-20041203.lisp | 12/4/2004 3:24 PM | 8,821 | 80% | 1,756 | goa... |
| redescription-20041206.lisp | 12/6/2004 1:46 PM | 10,005 | 80% | 2,034 | goa... |
| redescription-20041212.lisp | 12/12/2004 3:13 PM | 12,440 | 81% | 2,404 | goa... |
| redescription-20041216.lisp | 12/16/2004 10:07 AM | 11,713 | 79% | 2,404 | goa... |
| redescription-files.lisp | 12/4/2004 2:27 PM | 1,006 | 67% | 333 | goa... |
| redescription.lisp | 6/8/2005 3:25 PM | 17,467 | 80% | 3,480 | goa... |
| split-sequence.lisp | 12/2/2004 7:53 PM | 9,949 | 80% | 2,002 | goa... |
| summarize.lisp | 1/6/2005 10:34 AM | 11,892 | 81% | 2,262 | goa... |

-continued

| Name | Modified | Size | Ratio | Packed | Path |
|---|---|---|---|---|---|
| tar-exclude | 6/10/2005 4:36 PM | 85 | 33% | 57 | goa... |
| disj-redescription-test.lisp | 12/28/2004 7:42 PM | 802 | 57% | 346 | ...\tes |
| nyu-seb-4-windows-020-conn.txt | 12/18/2004 8:43 PM | 94,159 | 92% | 7,775 | ...\tes |
| nyu-seb-4-windows-020.txt | 12/18/2004 8:43 PM | 43,108 | 90% | 4,131 | ...\tes |
| nyu-seb-4-windows-070-conn.txt | 12/18/2004 8:13 PM | 15,862 | 88% | 1,977 | ...\tes |
| nyu-seb-4-windows-070.txt | 12/18/2004 7:49 PM | 14,214 | 88% | 1,728 | ...\tes |
| nyu-seb-4-windows-080.txt | 12/18/2004 5:03 PM | 14,078 | 88% | 1,709 | ...\tes |
| nyu-seb-4-windows-095.txt | 12/18/2004 3:20 PM | 227,599 | 96% | 8,847 | ...\tes |
| nyu-seb-4-windows.txt | 12/17/2004 5:18 PM | 261,354 | 97% | 9,045 | ...\tes |
| windowed-clustering-test.lisp | 12/26/2004 8:00 PM | 3,127 | 79% | 672 | ...\tes |
| wrair-seb-50ug-wc.lisp | 2/16/2005 1:38 PM | 3,221 | 78% | 719 | ...\tes |
| yeast-cell-cycle-data.lisp | 1/6/2005 4:43 PM | 3,834 | 84% | 624 | ...\tes |
| tl-package.lisp | 12/23/2004 9:45 AM | 2,301 | 67% | 753 | g...\tl\ |
| tl-pprinting.lisp | 12/24/2004 10:26 AM | 3,282 | 68% | 1,057 | g...\tl\ |
| tl.syntax.lisp | 12/24/2004 10:26 AM | 27,085 | 79% | 5,714 | g...\tl\ |
| tl.system | 12/23/2004 9:39 AM | 139 | 17% | 115 | g...\tl\ |
| delivery-script-dll.lisp | 10/29/2004 7:59 PM | 3,765 | 68% | 1,203 | ...\del |
| delivery-script-test.lisp | 1/3/2005 3:47 PM | 4,050 | 66% | 1,367 | ...\del |
| delivery-script.lisp | 5/19/2005 5:06 PM | 4,416 | 67% | 1,442 | ...\del |
| goaliezip.csh | 1/7/2005 12:26 PM | 176 | 40% | 106 | ...\del |
| lwdeli-linux.sh | 7/17/2004 2:21 PM | 686 | 48% | 360 | ...\del |
| lwdeli-macosx.sh | 7/5/2004 9:50 AM | 261 | 25% | 195 | ...\del |
| lwdeli.bat | 12/24/2004 11:08 AM | 206 | 21% | 162 | ...\del |
| lwdelidll.bat | 4/19/2004 12:40 PM | 337 | 37% | 213 | ...\del |
| genesis-clusterize.lisp | 1/3/2005 12:34 PM | 1,547 | 70% | 470 | ...\util |
| go-assoc-file-manip.lisp | 3/2/2005 6:11 PM | 3,936 | 69% | 1,203 | ...\util |
| graphsearch-support-package.lisp | 4/16/2004 1:50 PM | 717 | 44% | 400 | ...\gr |
| graphsearch-support.lisp | 4/16/2004 1:50 PM | 3,034 | 77% | 710 | ...\gr |
| graphsearch-support.system | 4/16/2004 1:50 PM | 203 | 40% | 121 | ...\gr |
| windowed-clustering-experiment.lisp | 6/8/2005 3:27 PM | 21,348 | 80% | 4,294 | goa... |
| 79 file(s) | | 1,015,850 | 89% | 116,041 | |

BACKGROUND INFORMATION

Analysis of functional or modal sets of data may focus on particular targeted characteristics or behaviors of subsets of the data, but it may not otherwise provide global and/or dynamic perspectives (e.g., invariants) that can be inferred collectively from a set of data. The conventional use of controlled vocabularies to describe sets of data may exploit only the taxonomical properties (e.g., membership or set containment) of the ontology, and likely may not otherwise use process-oriented properties to present dynamical perspectives on the whole systems, e.g., in biological systems. However, such dynamical perspectives can be important in obtaining a better analysis, e.g., a process-level understanding of the underlying dynamics and relationships that may be acting to produce the observed data.

Useful information can be obtained for characterizing a dynamical system by encoding its properties into the vernacular of temporal logic. Temporal logic may be defined in terms of Kripke structures, which can be expressed in the form (V, E, P). This can be understood to represent a "semantic support" for hybrid systems. Here, (V, E) can be understood to represent a directed graph having a plurality of reachable states of the system as vertices, V, and state transitions of the system as directed edges, E. For example, a classic cell-cycle can be characterized by six states: M, G1(I), G1(II), S, G2 and G0. P can represent a labeling of the states of the system with properties that apply to each state.

Conventional model systems and/or experimental conditions may be used conventionally to formally define a Kripke structure. Defining a Kripke structure can require defining states, a state transition diagram and providing a labeling of the states using a particular vocabulary.

A redescription can be understood to mean a shift of vocabulary, e.g., a different way of communicating a given aspect of information. Redescription mining is a technique that may be used to find sets (e.g., sets of genes) that can be associated with multiple definitions. In biological systems, the inputs to a redescription mining technique may be of different forms, e.g., a universal set of open reading frames ("ORF"s) associated with a particular organism, and various subsets, or "descriptors," which may be defined over this universal set. These subsets can be based on diverse sets of information, e.g., prior biological knowledge, or they may be defined by the outputs of algorithms operating on gene expression data. An exemplary descriptor can be from the field of systems biology, e.g., "genes involved in glucose biosynthesis."

Redescription mining can connect diverse vocabularies by relating set-theoretic constructs formed over the descriptors. For example, it may be possible to determine, in a biological system, that "genes expressed in the desiccation experiment except those participating in universal stress response" is the same as "genes significantly expressed 2-fold positively or negatively in the salt stress experiment." This redescription relates a set difference in the first descriptor to a set union in the second descriptor. Such equivalence relationships can assist in unifying diverse ways of qualifying information by identifying regions of similarity and/or overlap.

Microarray technologies can be utilized to analyze biological processes, e.g., to characterize cellular transcriptional states by simultaneously measuring mRNA abundance of many thousands of genes. The levels of gene expression (absolute or relative), which can be measured while a cell is subjected to a particular ambient condition, can be analyzed using conventional statistical techniques, visualization techniques, and/or data mining algorithms/techniques. Statistical and data-mining analysis techniques may focus on targeted sets of genes, e.g., those that may vary in a well correlated manner, are under similar regulatory control, or may have consistent functional annotation or ontological categorizations. However, there may be additional information in the full data set which can remain unrecognized or be inadvertently discarded when using these techniques, and possibly contain a richer and more detailed picture.

Thus, there may be a need for methods, systems and software arrangements that are capable of providing global and dynamic perspectives on transcription states by combining quantitative analysis of data sets with formal models that can characterize various global phenomena, e.g., temporal evolution of biological processes or other sequential data patterns.

SUMMARY OF THE INVENTION

One of the objects of the present invention is to provide systems, methods, software arrangements, and computer-accessible media for reconstructing formal descriptive models of processes from data, e.g., functional and/or modal data using a particular ontology or a controlled vocabulary.

In one exemplary embodiment of the present invention, a set of data to be analyzed can be obtained, where the data may be heterogeneous and of diverse nature, e.g., functional, temporal or modal data. The data may be generated by a dynamical system, and may represent diverse phenomena of different nature, e.g., gene expressions, probe values, neural data, or clicks on web links. Alternatively or additionally, the data may be dependent on one or more modal parameters, e.g., time, dosage, or an environmental condition. The data may be provided in the form of a matrix.

The data may be organized into a plurality of states and state transitions between the states. For example, states may include clusters, possible worlds, etc., and state transitions may include persistence, causality, continuity, etc. This organization can be performed using conventional procedures, e.g., a clustering procedure employing a K-means technique, an SOM technique, an agglomerative technique, or a graph-based technique, a biclustering procedure, or an information-bottleneck-based procedure, etc.

In another exemplary embodiment of the present invention, each state may be annotated using one or more labels provided by a set of atomic propositions, e.g., a controlled vocabulary. The vocabulary can be provided through different analytical techniques, e.g., by an ontology, statistical text mining, etc. The model represented by a number of labeled states and associated state transitions may be referred to as a "Hidden Kripke Model." Such models can have the form of a conventional Kripke model, and/or may be described as "hidden" because the model is derived from the data itself using the controlled vocabulary or ontology. Conventional Kripke models, in contrast, can be formulated a priori based on some system knowledge, and then data can be fitted to the assumed model.

In a further exemplary embodiment of the present invention, a probability coefficient, or p-value, may be assigned to one or more states or clusters in the model. The p-values may be computed by a statistical analysis, e.g., applying a Fisher exact test, utilizing a Jacquard Coefficient, etc., and they may be sub-selected by a separate procedure, e.g., false-discovery rate ("FDR") criteria. These p-values can indicate the degree of likelihood that a given state and transition will conform to the generated model. A new model may optionally be generated based on a different organization of the data into states and state transitions, if the p-values for a generated model are not sufficiently large.

In a still further exemplary embodiment of the present invention, invariants may be extracted from the generated model, which can be a Kripke model. These invariants can provide additional insight into the dynamical system or phenomena that created or influenced the data. Extraction of invariants may be performed using a formal approach, e.g., using modal logic, fuzzy logic, or temporal logic such as, for example, linear-time or branching-time logic, etc., by combining the labels systematically, e.g., using model checking and/or iterative extension techniques. The generated model and associated invariants may be used to provide responses to user queries about the data set. This procedure can permit additional information to be obtained regarding relationships among the data, the nature of the underlying processes, and/or patterns that may be present in the dynamical and/or multivariate system that produced the data.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF EXEMPLARY EMBODIMENTS

Figure 1:
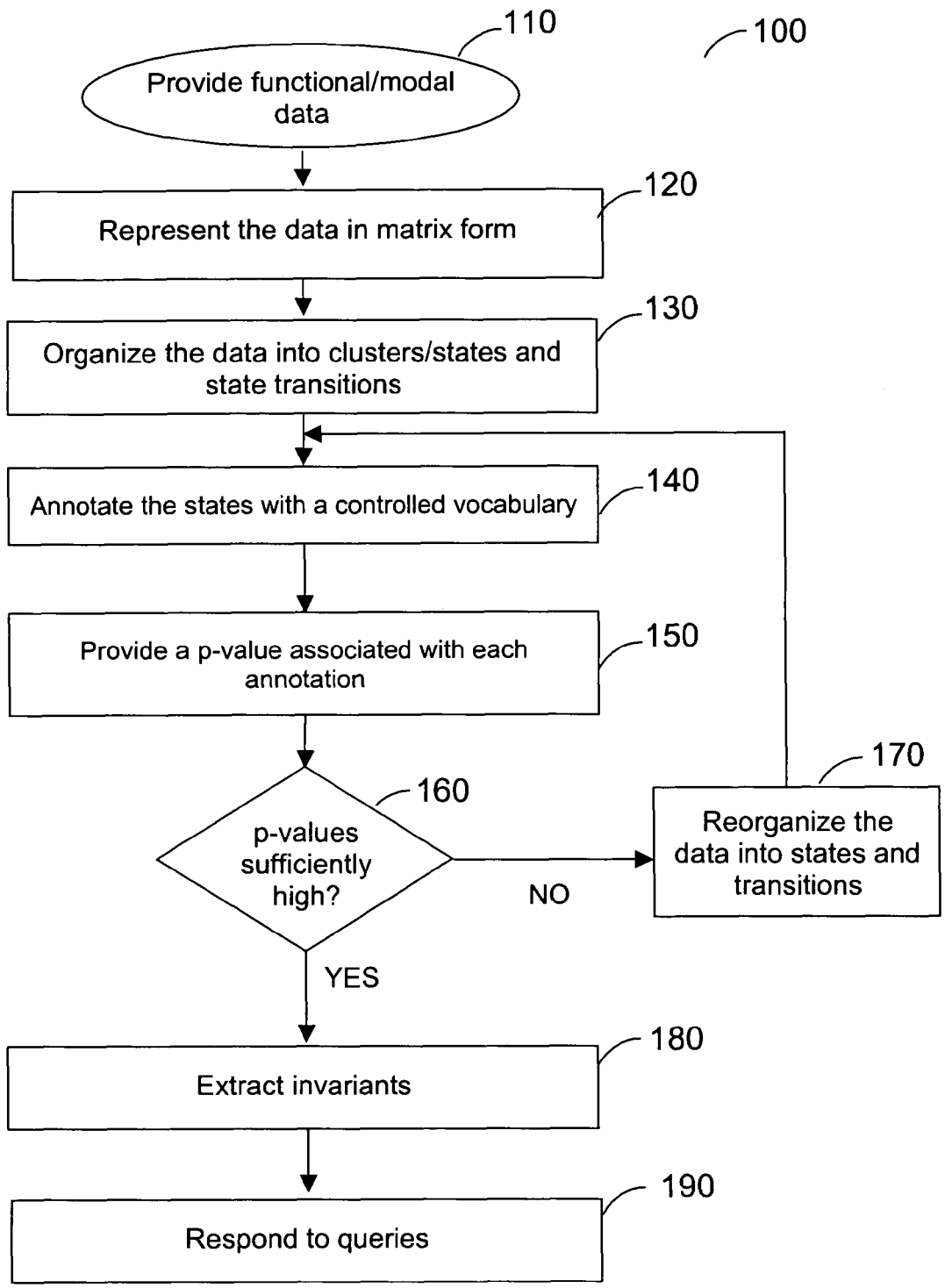
FIG. 1 is a general flow diagram of a certain exemplary embodiment of a method according to the present invention.

The method, system and software arrangement according to an exemplary embodiment of the present invention, collectively referred to herein as "GOALIE" (an acronym of "Gene Ontology Algorithmic Logic for Information Extraction"), can use a gene ontology ("GO") biological process taxonomy (or any other ontology or controlled vocabulary collection, e.g., MeSH, UMLS, etc.) to automatically extract temporal or other invariants from numerical data. The data may be organized modally, e.g., along time, concentration, dosage, or any other independent variable or combinations thereof. GOALIE is capable of integrating data-driven reasoning, e.g., analysis of time course data sets with model-building capabilities.

Conventional analysis techniques can require that a Kripke structure be pre-defined based on knowledge or assumptions about processes that are related to the data, and fitting of the data to the pre-defined structure. GOALIE can utilize and/or include an exemplary method for obtaining Kripke structures directly from data sets, e.g., time course micro-array data sets. Such "hidden" Kripke models ("HKM"s), as described below, can be generated by combining concepts and techniques used in a redescription mining with "model checking" techniques, e.g., those used for systems biology. This exemplary approach can provide both global and dynamic perspectives of transcriptional states, in which properties of a dynamical system can be described using the vernacular of temporal logic.

A "hidden" Kripke model can include a set of hidden states or possible worlds, together with transitions among the states, where the states may be labeled with logical propositions. An HKM may appear to be a variation of the conventional Hidden Markov Model ("HMM") that may be used in the field of bioinformatics. However, it is likely that an HKM as described herein may have no readily observable emission alphabets. To generate an HKM, true logical propositions selected from a universe of discourse may be inferred or redescribed. For example, according to the exemplary methods of the present invention described herein, an HKM may be generated without assuming a particular system architecture a priori. The transitions associated with the HKM can be inferred from the structure and/or the semantics of the possible worlds or universes. When the HKM structure has been inferred, however, it can be utilized to identify invariants associated with the data set, e.g., predicting dynamical properties of unannotated genes or behavior of a cell, an organ or an organism at a system level under various environmental, physical, or other conditions.

To obtain the Kripke structure from a reachability graph, a set of atomic propositions ("AP") can be defined to denote the properties of individual states. For example, a proposition p may be defined as "cell size large enough for division." The proposition p may not be true in states M, G1(I), and G0, and it may become true in state G1(II). A vocabulary of propositions may be defined, and the state symbols (e.g., M, G1(I), etc.) may be replaced with the set of atomic propositions that apply to each state. Thus, P can represent a map from the set of states to the set of atomic propositions AP. The resulting labeled graph can represent the Kripke structure.

In accordance with certain exemplary embodiments of the present invention, redescriptions can be utilized to infer the Kripke structures. For example, the redescription can be based on a method combining one particular vocabulary with a particular modal data set, e.g., combining gene expression levels at specified time points or intervals with a particular vocabulary that may be related to an ontology, e.g., a GO biological process taxonomy. The redescription may be equivalent or substantially similar to labeling time-dependent expression clusters (e.g., the states) with atomic symbols based on GO categories (e.g., the propositions). To obtain state transitions, redescription can be performed again, where the second redescription involves connecting a pair of states, e.g., a state defined over one time slice to a state defined in a neighboring (e.g., a successive) time slice. Thus, descriptors defined in a propositional temporal logic can be utilized to perform redescriptions both within and across intervals of time. By combining these redescriptions into the Kripke structure or model, a global understanding of the temporal nature of the underlying processes can be obtained. This exemplary approach can integrate techniques using model-checking methods with a data-driven emphasis of redescription techniques as described herein.

GOALIE can be used to analyze a time-course biological micro-array experiment by first weighing time-points using a sliding-window. This weighing procedure can be performed using various algorithms, e.g., a Haar square weight function or a smoother function such as, e.g., a Gaussian distribution. This exemplary procedure may be similar in concept to a performance of a multi-frequency analysis of signals. The result of this set of instructions can be a set of data windows which may overlap. The data windows can then be clustered using one of several conventional procedures, e.g., a K-means technique.

Associations or redescriptions of each cluster in each window can then be constructed using a particular controlled vocabulary, e.g., ontological annotations for genes and proteins. Each cluster in each data window may be associated with one or more descriptive terms obtained from the controlled vocabulary (e.g., from the GO process taxonomy). This association can be achieved by performing data-dependent statistical tests. These exemplary tests can include many different approaches, e.g., a simple implication covering technique which may be based on conventional procedures such as Jacquard similarity, a Hypergeometric test, or a Fisher Exact Test.

Labeling of the clusters may also be performed using an empirical Bayes approach. Labeled clusters can then be "chased" to yield transitions to clusters in neighboring time windows. The basis for relating clusters across time windows may be the commonality of labelings as revealed by the previous procedure. The above stages can then be repeated, as needed, in an iterative fashion to refine the initial clusterings (e.g., in response to the identified state transitions) or to adjust the transitions (e.g., to reflect new cluster assignments). Since the propositions can be obtained from a controlled vocabulary, it may be possible to combine these propositions to create formulae in a propositional temporal logic (CTL), which may be useful in describing complex cellular dynamics.

Appropriate statistical corrections may also be employed in conjunction with these tests, e.g., applying a Bonferroni correction or a Benjamini-Hochberg correction, which may reduce a false discovery rate of inferred redescriptions. Such constructions can be applied to a fixed set of clusters using conventional techniques. Further, GOALIE is capable of coupling such techniques using a time-course analysis (or an analysis with respect to the course of another independent variable) of numerical data. This exemplary approach can thus provide information relating to correlations among processes occurring within, e.g., a biological or other dynamical system.

A set of graph relationships among data windows can then be generated based on associations among clusters and terms provided by the particular controlled vocabulary. This exemplary set of graph relationships can be used to construct exemplary temporal logic formulae describing the system (e.g., a biological system) at a phenomenological level. The construction of such graph can depend on the choice of the controlled vocabulary or ontology, the quality of the basic annotations available (e.g., the annotation of a specific gene product with a number of terms), and/or the quality of the statistical tests used in the previous procedure of constructing associations or redescriptions of each cluster.

The number of the clusters, and therefore the number of associations and/or redescriptions between controlled vocabulary terms and clusters, can then be optimized by performing an exemplary optimization procedure on the data, whereas the routine may be formulated in terms of an information bottleneck problem. An objective function can be generated by combining several mutual information factors denoting interdependencies between data and ontology, e.g., in a biological analysis they can be gene products and controlled vocabulary terms. This procedure can improve and/or maximize the consistency of inter-window associations (e.g., redescriptions) between sets of terms and clusters in each data window. They can be useful because the information bottleneck formulation can be expressed in terms of opposing constraints. This optimization routine can be analogous to competitive learning procedures and unsupervised techniques that cluster in a primary space using information from an auxiliary space.

The set of graph relationships can then be organized in a directed acyclic graph ("DAG"), and circularities may be re-introduced using a wrapping technique. An edge can be placed between a cluster in a window and another cluster in a previous or successor window. Each edge may be tagged with the terms that (i) are shared between the redescriptions of the two clusters and/or (ii) are associated only in the first cluster, and the terms that are associated only to the second cluster. The set of temporal logic sentences may be reconstructed by analyzing different "chains" of edges in the DAG. For example, finding a set of terms that appear in each edge of a chain from the initial window to the last window can generate a particular temporal logic sentence, likely denoting the invariance of the set of terms.

An exemplary flow diagram of a method 100 according to an exemplary embodiment of the present invention is shown in FIG. 1. For example, data to be analyzed can be received (step 110), where the data may be, e.g., functional, temporal or modal. The data may be generated by different mechanisms, e.g., a number of sensors measuring important variables, e.g., gene expressions, probe values, neural data, or clicks on web links. Alternatively or additionally, the data may be dependent on one or more parameters, e.g., time, dosage, or a condition variable. Such data may be provided as a matrix (step 120), where each row can represent an index of the sensors, and each column can represent a modal variable.

A "Hidden Kripke Model" may then be constructed by organizing the matrix of data into states and state transitions (step 130). For example, the states may include clusters, possible worlds, etc., and the state transitions may include any one or more of many important binary relations, e.g., persistence, causality, continuity, etc. The model construction can be performed using a conventional procedure, e.g., a clustering procedure employing a K-means technique, an SOM technique, an agglomerative technique, or a graph-based technique, a biclustering procedure, and/or an information-bottleneck-based procedure, etc.

The states may then be annotated or labeled using the particular controlled vocabulary (step 140). The vocabulary can be provided, e.g., by an ontology, statistical text mining, etc. A p-value may then be assigned to each label or annotation (step 150). The p-values may be determined by a statistical analysis, e.g., applying a Fisher exact test, utilizing a Jacquard Coefficient, etc., and they may be sub-selected using additional statistical criteria, e.g., false-discovery rate ("FDR") criteria. The p-values may optionally be assessed to determine if they are greater than a predetermined value, or if they are sufficiently high for the desired application (step 160). If the p-values are not sufficiently large, the data may be rearranged into the different states and state transitions (step 170). This can be performed using different criteria for identifying the states and transitions than were used previously. The rearranged states and transitions may then be again annotated (step 140).

After the states are annotated (step 140) and provided with p-values (step 150), invariants of the resulting Kripke structure may be extracted (step 180). The extraction of invariants may be performed using a formal method, e.g., modal logic, temporal logic such as, for example, linear-time or branching-time logic, fuzzy logic, etc., by combining the labeled annotations algorithmically, e.g., using model checking and/or iterative extension techniques. The Kripke model and the associated invariants may be used to generate responses to user queries (step 190). This exemplary procedure can permit additional information to be obtained regarding the relationships among the data and the nature of the underlying processes or patterns that may be present in the dynamical or multivariate system, which produced the data.

EXAMPLE

Certain exemplary embodiments of the method, system and software arrangement according to the present invention have been used to analyze a yeast cell cycle data set described in Spellman et al., "Comprehensive Identification of Cell Cycle Regulated Genes of the Yeast *Saccharomyces Cerevisiae* by Microarray Hybridization," *Molecular Biology of the Cell*, 9 (12), pp. 3273-3297, December 1998 ("Spellman"). Analysis of this exemplary data using an exemplary embodiment of the present description is described in Ramakrishnan et al., "Reconstructing Formal Temporal Models of Cellular Events using the GO Process Ontology," Bio-Ontologies SIG Meeting, ISMB 2005, Detroit, U.S.A. 2005.

For example, the data set includes several time course microarray measurements of gene expression levels under a number of cell synchronization treatments (e.g., $\alpha$-factor, Cdc15, and elutriation treatments). An analysis was performed on a data set prepared from the $\alpha$-factor time course data using the full set of more than 6000 genes in accordance with exemplary embodiments of the present invention.

The $\alpha$-factor time course data was partitioned into windows containing four time points each, yielding eight windows. Each window was partitioned into 15 clusters, resulting in a total of 120 clusters. The 120 clusters were redescribed using a p-value of 0.05. The redescriptions across the windows were then computed using a stringent Jaccard's coefficient $\theta=0.8$.

Figure 2:
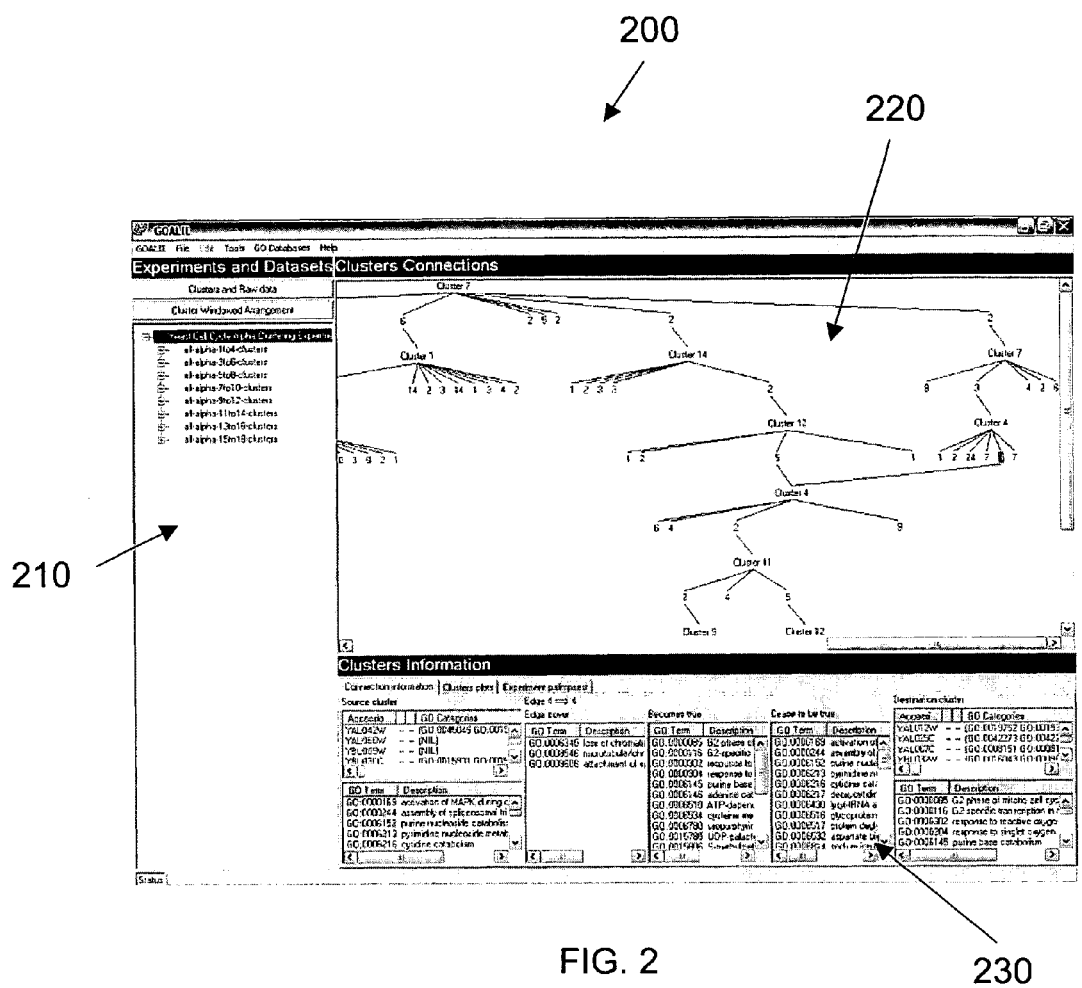
FIG. 2 is an illustration of a display of an exemplary output of an exemplary embodiment of systems and/or software arrangements in accordance with the present invention.

FIG. 2 shows an exemplary display (e.g., a screen shot 200) of another exemplary embodiment of the system and software arrangement (GOALIE) in accordance with the present invention. In particular, a left portion 210 of the screen shot 200 depicts various time slices utilized in the exemplary data analysis. A top right portion 220 of the screen shot 200 depicts an image of a cluster connections graph that may be used for an interactive exploration of the data using redescriptions. A bottom right portion 230 of the screen shot 200 identifies exemplary propositions that remain true, propositions that become true, and exemplary propositions that cease to be true when going from a source cluster to a destination cluster.

Figure 3:
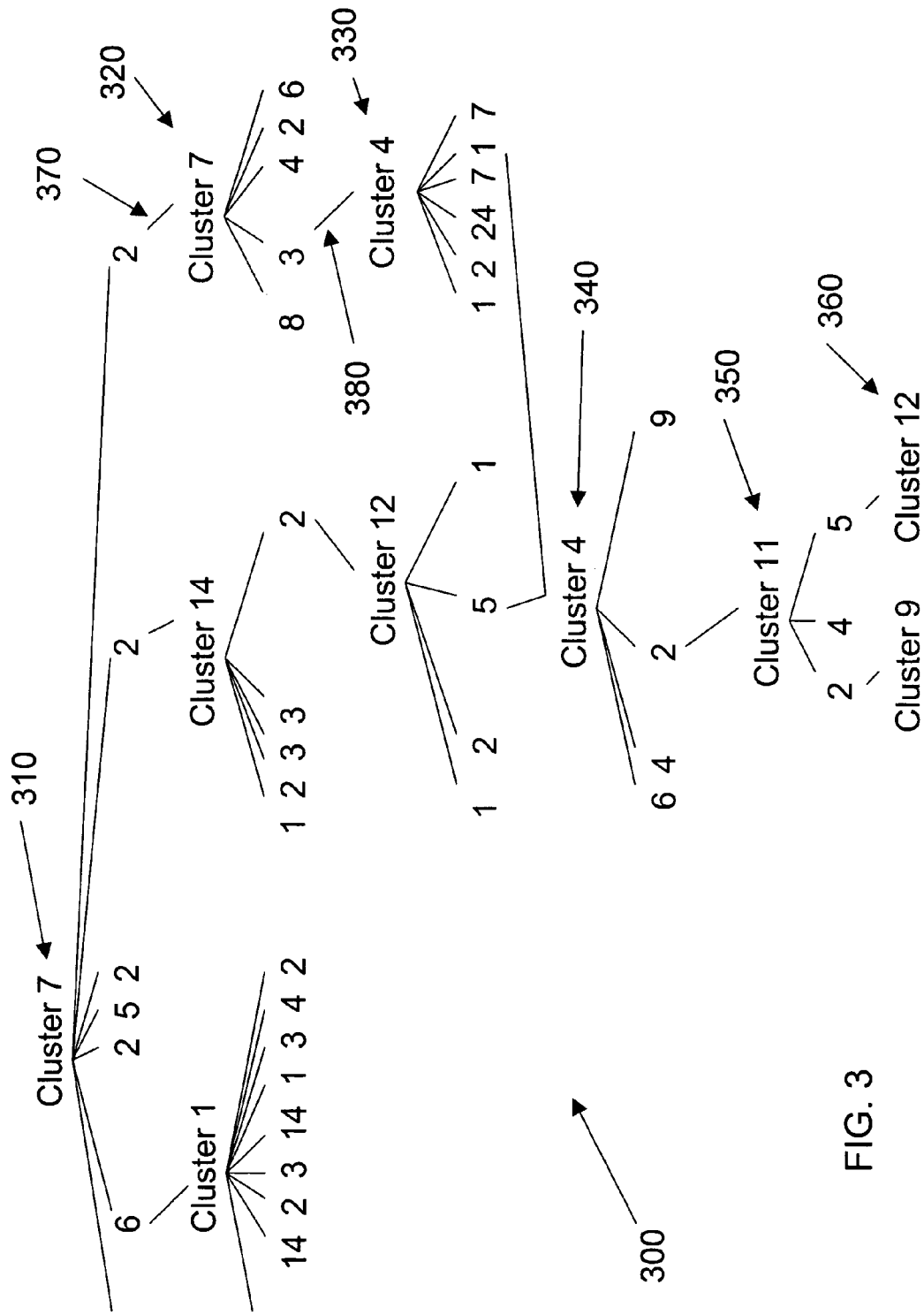
FIG. 3 is an illustration of an exemplary diagram showing sample states and state transitions.

A representation of the cluster connection graph 220 of FIG. 2 is shown in FIG. 3. In this exemplary graph, Cluster 7 (310) in the first window has been "chased" to yield a chain through successive time windows that includes Clusters 7 (320), Cluster 4 (330), Cluster 4 (340), Cluster 11 (350), and Cluster 12 (360), respectively. The links between the clusters are labeled with the cardinality of the GO terms they have in common. For example, the first edge 370 in this chain involves 2 common GO terms, the second edge 380 involves 3 common GO terms, etc.

Figure 4:
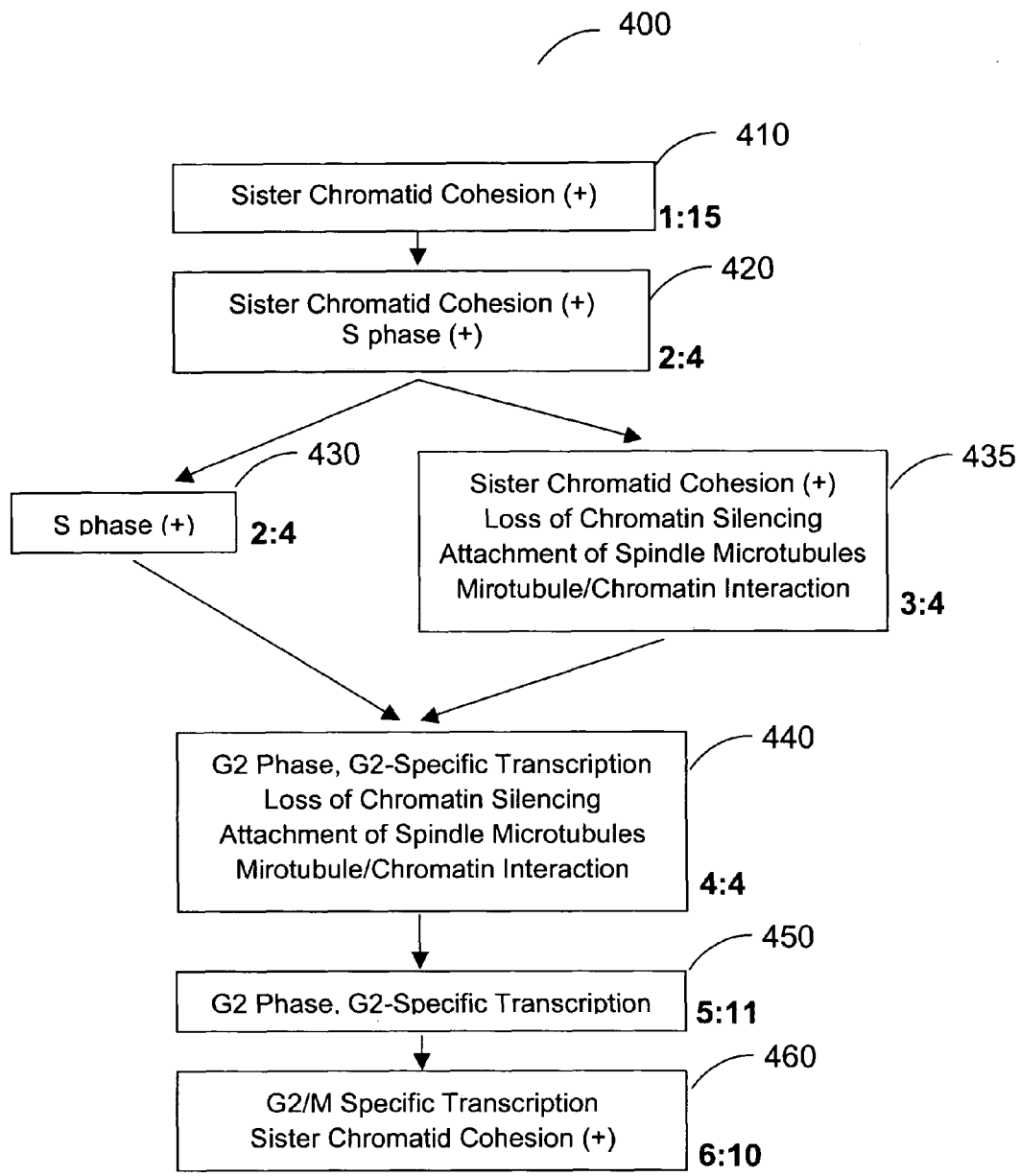
FIG. 4 is an exemplary Kripke diagram that may be generated in accordance with a further exemplary embodiment of the present invention.

An exemplary Kripke diagram 400 derived from the yeast cell cycle data set described in Spellman using the exemplary embodiments of the method, system and software arrangement according to the present invention is shown in FIG. 4. The derivation of this exemplary Kripke diagram 400, which can be obtained using the information provided by GOALIE similar to that shown in FIG. 2, is described hereinbelow. In the following descriptions, the notation: "Cluster~L:N," with L and N representing positive integers, can be understood to refer to Cluster N in time course window L.

Time Course Window 1 to Time Course Window 2: Connection 1:15 to 2:4. For example, referring to FIG. 4, the inspection of a first cluster 410 in a first window (e.g., Cluster~1:15) may indicate that there is only one connection which is worth following to a cluster 420 in a second window (e.g., Cluster~2:4). The criteria for this choice can be that an edge connecting the two clusters 410, 420 is labeled (among many others) by, e.g., the GO categories 'positive regulation of sister chromatid cohesion' (GO:0045876), and that Cluster~2:4 420 is labeled by, e.g., the category 'regulation of S phase of mitotic cell cycle' (GO:0007090), i.e., Cluster~2:4 420 becomes activated in a second time course window.

Time Course Window 2 to Time Course Window 3: Connection 2:4 to 3:2. Next, Cluster~2:4 420 may be reviewed in a second time-course window. There are two connections that can be followed to time-course window 3, a connection to Cluster~3:2 430 and a connection to Cluster~3:4 435. The GO category 'regulation of S phase of mitotic cell cycle' (GO:0007090) is maintained across the connection to Cluster~3:2 430, while the category 'positive regulation of sister chromatid cohesion' (GO:0045876) becomes inactive.

Time Course Window 3 to Time Course Window 4: Connection 3:2 to 4:4. A subsequent connection in this chain of states may indicate that the GO categories 'G2 phase of mitotic cell cycle' (GO:0000085), 'G2-specific transcription in mitotic cell cycle' (GO:0000116), 'microtubule/chromatin interaction' (GO:008546), and 'attachment of spindle microtubules to kinetochore' (GO:008608) can each become active in Cluster~4:4 440.

Time Course Window 4 to Time Course Window 5: Connection 4:4 to 5:11. Based on analysis of the yeast data by GOALIE, this exemplary connection may be the only significant connection between time windows 4 and 5. The GO categories 'G2 phase of mitotic cell cycle' (GO:0000085), and 'G2-specific transcription in mitotic cell cycle' (GO: 0000116) remain active in Cluster~5:11 450, while the two categories 'microtubule/chromatin interaction' (GO: 008546), and "attachment of spindle microtubules to kinetochore" (GO:008608) can become inactive.

Time Course Window 5 to Time Course Window 6: Connection 5:11 to 6:10. In this next procedure, the G2 related categories may become inactive, while M phase related activities may be initiated in Cluster~6:10 460. For example, the GO categories 'G2 phase of mitotic cell cycle' (GO: 0000085) and 'G2-specific transcription in mitotic cell cycle' (GO:0000116) can become inactive. The GO categories 'G2/M-specific transcription in mitotic cell cycle' (GO:0000117) and 'positive regulation of sister chromatid cohesion' (GO: 0045876) become active.

Following the exemplary sequential chains downward Cluster~6:10 460, connections that exhibit an expected transition from G2 to M phases can be located, e.g., in transition from Time Course Window 7 to Time Course Window 8, Connection 7:11 to 8:12. These clusters are not shown in FIG. 4.

GOALIE may have all pre-processed information available to automatically generate, e.g., two temporal logic formulae. The first formula may indicate that there can exist a directed path connecting a sequence of clusters in successive time windows such that the GO category "sister chromatid cohesion" holds until the cell enters G2 phase. The second formula may indicate, e.g., that 'the cell, after dwelling in G2 phase, enters M phase.' This feature may be generally recognized as a property of a cell cycle. However, this result is derived automatically, as described herein, from numerical expression matrices and a static ontological annotation.

Further, GOALIE can incorporate conventional query-based model checking techniques that can be used by a user, e.g., a biologist to formulate a Natural Language ("NL") query or a query formulated in a temporal logic language (e.g., CTL) about the temporal evolution of the exemplary system.

The invariants may be extracted from the DAG of cluster relationships. Translating such formulae into a NL form can be simplified by using exemplary embodiments of the present invention. For example, the following examples illustrate two exemplary invariants that may be derived from the exemplary analysis of gene data described hereinabove:

```
Exists_path('sister chromatid cohesion'
    Until ('G2 phase' And 'G2 specific transcription'))
Eventually(Exists_path(('G2 phase' And 'G2 specific transcription')
    Until 'G2/M specific transcription'))
```

The exemplary embodiments of the methods according to the present invention described herein may be used with various types of data and different controlled vocabularies and/or ontologies. For example, in addition to biological applications, the systems, methods and software arrangements in accordance with exemplary embodiments of the present invention may be used to describe and understand data relating to various fields of application, e.g., consumer purchasing patterns, vehicular traffic patterns, and the like. The exemplary embodiments of the present invention may also have biological applications to drug-or-vaccine discovery, understanding behavior of a cell in an altered diseased state (e.g., cancer, neuro-degeneration or auto-immune disease), genetically modifying a natural wild-type organism, genetic-engineering, etc. Other exemplary applications may include providing improved understanding of such phenomena as neural behavior, market behavior of a population of users interacting on the Internet, etc.

Figure 5:
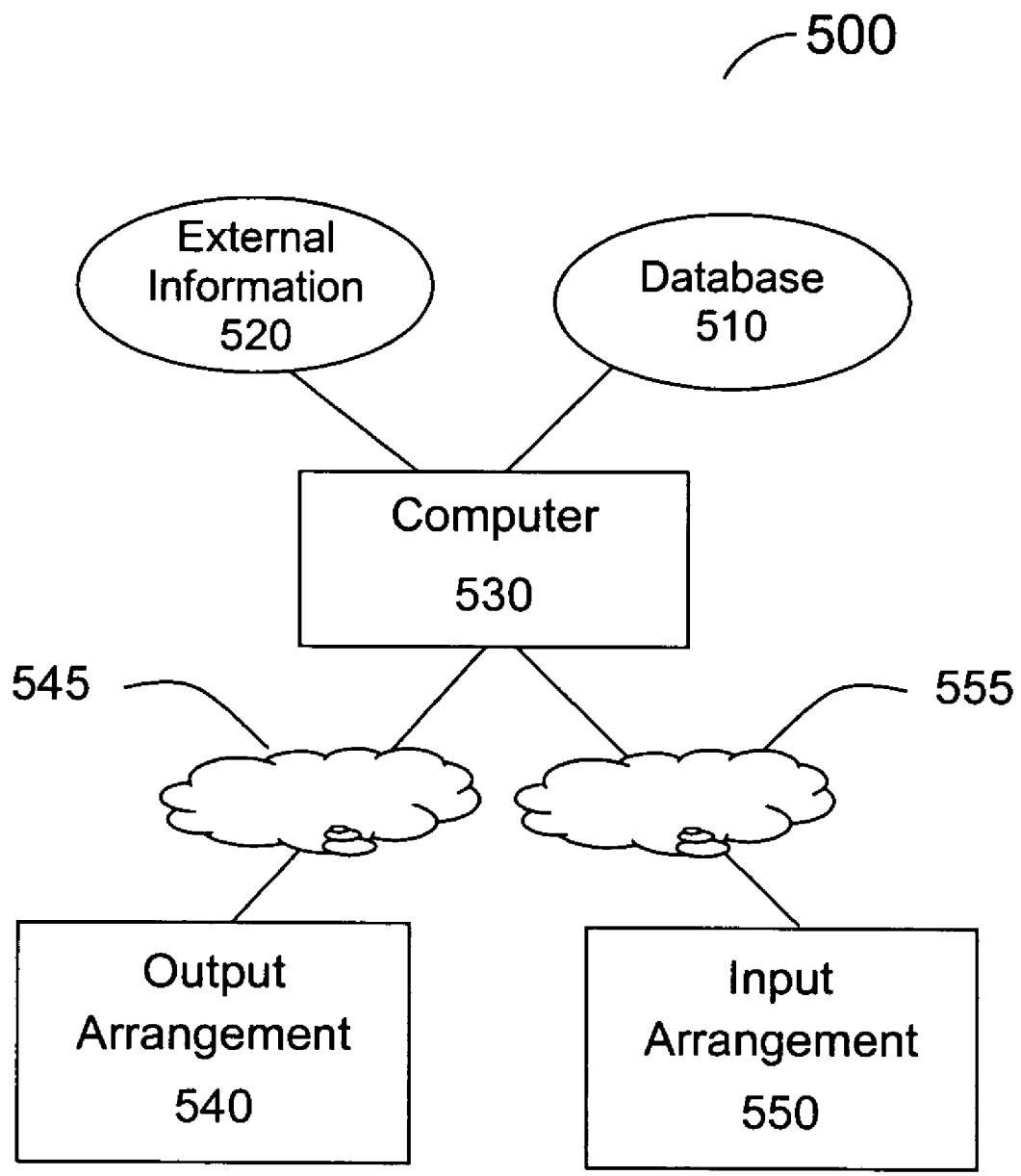
FIG. 5 is a schematic diagram of the system in accordance with a certain exemplary embodiment of the present invention.

An exemplary embodiment of a system 500 for implementing the present invention is shown in FIG. 5. For example, a database 510 of the system 500 may contain one or more sets of data to be analyzed. The system 500 may further store, obtain and/or utilize external information 520 which can include, e.g., one or more controlled vocabularies, as well as exemplary procedures that may be used, e.g., to perform one or more steps required to construct hidden Kripke models, generate p-values, etc. The external information 520 and information contained in the database 510 can be communicated to a computer 530. The computer 530 may comprise a processing arrangement, and may be configurable, e.g., to represent the data in matrix form, organize the data into states and state transitions, annotate or label states, generate p-values associated with the various states, generate Kripke models based on the data, extract invariants associated with the Kripke model, and/or perform other computational and/or data handling procedures.

Information relating to the data sets may be communicated to an optional output arrangement 540. The output arrangement 540 may include any suitable display device, including but not limited to a video monitor, a printer, a data storage medium, and the like. The output arrangement 540 can be in communication with the computer 530 using an output connection 545, which may include a wireless connection, a wired connection, a signal communication line, a local area network, a wide area network, a connection to the Internet, etc.

The system 500 may further comprise an input arrangement 550, which can include any suitable input device capable of providing signals to the computer 530. The input arrangement 550 can include, but is not limited to, a mouse, a keyboard, a touch screen, a pointing device, and the like. The input arrangement 550 can be in communication with the computer 530 using an input connection 555, which may include, e.g., a wireless connection, a wired connection, a signal communication line, a local area network, a wide area network, a connection to the Internet, etc. The input arrangement 550 may be used, e.g., to specify data sets and/or controlled vocabularies to be used, and/or queries to be processed based on a generated Kripke structure. The computer 530 can include a hard drive, CD ROM, RAM, and/or other storage devices or media which can include thereon software, which can be configured to execute the exemplary embodiments of the method and software arrangement of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, all publications, patents and patent applications referenced herein are incorporated herein by reference in their entireties.

What is claimed is:

1. A method for at least one of generating or utilizing a model associated with a data set using predetermined semantics, comprising:
    organizing the data set into a plurality of states and a plurality of state transitions to generate the model, wherein at least one transition of the plurality of state transitions is associated with each of the states;
    associating each of the states with at least one label relating to the predetermined semantics;
    assigning at least one probability to at least one state of the plurality of states based on a likelihood that the at least one state follows the at least one transition associated with the at least one state; and
    using a computing arrangement, determining at least one invariant associated with the model as a function of the at least one probability, wherein the at least one invariant is determined using at least one of a modal logic technique, a linear-time temporal logic technique, a branching-time temporal logic technique, or a fuzzy logic technique.

2. The method of claim 1, further comprising:
    receiving a query relating to the data set; and
    providing a response to the query based at least in part on the model.

3. The method of claim 1, further comprising:
    re-organizing the data set into a plurality of further states and a plurality of further state transitions based at least in part on the at least one probability assigned to the at least one state, wherein at least one further transition of the plurality of further state transitions is associated with each of the further states.

4. The method of claim 1, wherein the data set comprises at least one of modal data, temporal data or functional data.

5. The method of claim 3, wherein the data set is associated with at least one of a gene expression, a probe value, a click on a web link, or a cellular event.

6. The method of claim 1, wherein the data set is arranged in a form of a matrix.

7. The method of claim 1, wherein the data set is organized using at least one of a clustering procedure, a K-means procedure, an SOM procedure, an agglomerative procedure, a graph-based procedure, a biclustering procedure, or an information-bottleneck-based procedure.

8. The method of claim 1, wherein the predetermined semantics are provided by at least one of a controlled vocabulary, an ontology, a gene ontology, a prior knowledge relating to the data set, a procedure which operates on gene expression data, or a statistical text mining procedure.

9. The method of claim 1, wherein the at least one probability is determined using at least one of a Fisher exact test or a Jacquard coefficient technique.

10. The method of claim 1, wherein the at least one invariant is determined by combining at least two labels.

11. The method of claim 10, further comprising combining at lest two labels using at least one of a model checking technique or an iterative extension technique.

12. The method of claim 1, further comprising at least one of displaying or storing information related to the model in a storage arrangement in at least one of a user-accessible format or a user-readable format.

13. The method of claim 1, wherein at least one of the states or the state transitions comprise at least one of a time factor or a temporal component.

14. A system for at least one of generating or utilizing a model associated with a data set using predetermined semantics, comprising:
    a processing arrangement; and
    a computer-readable medium which includes thereon a set of instructions, wherein the set of instructions is configured to program the processing arrangement to:
    (a) organize the data set into a plurality of states and a plurality of state transitions to generate the model, wherein at least one transition of the plurality of state transitions is associated with each of the states;
    (b) associate each of the states with at least one label relating to the predetermined semantics;
    (c) assign at least one probability to at least one state of the plurality of states based on a likelihood that the at least one state follows the at least one transition associated with the at least one state; and
    (d) determine at least one invariant associated with the model as a function of the at least one probability, wherein the at least one invariant is determined using at least one of a modal logic technique, a linear-time temporal logic technique, a branching-time temporal logic technique, or a fuzzy logic technique.

15. The system of claim 14, wherein the set of instructions is further configured to program the processing arrangement to:
    (e) receive a query relating to the data set; and
    (f) provide a response to the query based at least in part on the model.

16. The system of claim 14, wherein the set of instructions is further configured to program the processing arrangement to re-organize the data set into a plurality of further states and a plurality of further state transitions based at least in part on the at least one probability assigned to the at least one state, wherein at least one further transition of the plurality of further state transitions is associated with each of the further states.

17. The system of claim 14, wherein the set of instructions is configured to program the processing arrangement to organize the data set using at least one of a clustering procedure, a K-means procedure, an SOM procedure, an agglomerative procedure, a graph-based procedure, a biclustering procedure, or an information-bottleneck-based procedure.

18. The system of claim 14, wherein the set of instructions is further configured program the processing arrangement to at least one of display or store information related to the model in a storage arrangement in at least one of a user-accessible format or a user-readable format.

19. The system of claim 14, wherein at least one of the states or the state transitions comprise at least one of a time factor or a temporal component.

20. A software arrangement, stored on a computer-readable medium, for at least one of generating or utilizing a model associated with a data set using predetermined semantics, comprising:
   a first set of instructions which, when executed by a processing arrangement, configure the processing arrangement to organize the data set into a plurality of states and a plurality of state transitions to generate the model, wherein at least one transition of the plurality of state transitions is associated with each of the states;
   a second set of instructions which, when executed by the processing arrangement, configure the processing arrangement to associate each of the states with at least one label relating to the predetermined semantics;
   a third set of instructions which, when executed by the processing arrangement, configure the processing arrangement to assign at least one probability to at least one state of the plurality of states based on a likelihood that the at least one state follows the at least one transition associated with the at least one state; and
   a fourth set of instructions which, when executed by the processing arrangement, configure the processing arrangement to determine at least one invariant associated with the model as a function of the at least one probability, wherein the at least one invariant is determined using at least one of a modal logic technique, a linear-time temporal logic technique, a branching-time temporal logic technique, or a fuzzy logic technique.

21. The software arrangement of claim 20, further comprising:
   a fifth set of instructions which, when executed by the processing arrangement, configure the processing arrangement to receive a query relating to the data-set; and
   a sixth set of instructions which, when executed by the processing arrangement, configure the processing arrangement to provide a response to the query based at least in part on the model.

22. The software arrangement of claim 20, further comprising:
   a further set of instructions which, when executed by the processing arrangement, configure the processing arrangement to re-organize the data set into a plurality of further states and a plurality of further state transitions based at least in part on the at least one probability assigned to the at least one state, wherein at least one further transition of the plurality of further state transitions is associated with each of the further states.

23. The software arrangement of claim 20, wherein the first set of instructions, when executed by the processing arrangement, configure the processing arrangement to organize the data set using at least one of a clustering procedure, a K-means procedure, an SOM procedure, an agglomerative procedure, a graph-based procedure, a biclustering procedure, or an information-bottleneck-based procedure.

24. The software arrangement of claim 20, further comprising a further set of instructions which, when executed by the processing arrangement, configure the processing arrangement to at least one of display or store information related to the model in a storage arrangement in at least one of a user-accessible format or a user-readable format.

25. The software arrangement of claim 20, wherein at least one of the states or the state transitions comprise at least one of a time factor or a temporal component.

26. A non-transitory computer-accessible medium, which has stored thereon computer executable instructions for at least one of generating or utilizing a model associated with a data set using predetermined semantics, which, when executed by a hardware processing arrangement, configure the hardware processing arrangement to execute-procedures-comprising:
   (a) organize the data set into a plurality of states and a plurality of state transitions to generate the model, wherein at least one transition of the plurality of state transitions is associated with each of the states;
   (b) associate each of the states with at least one label relating to the predetermined semantics;
   (c) assign at least one probability to at least one state of the plurality of states based on a likelihood that the at least one state follows the at least one transition associated with the at least one state; and
   (d) determine at least one invariant associated with the model as a function of the at least one probability, wherein the at least one invariant is determined using at least one of a modal logic technique, a linear-time temporal logic technique, a branching-time temporal logic technique, or a fuzzy logic technique.

27. The computer-accessible medium of claim 26, wherein the set of instructions is further configured to program the processing arrangement to:
   (e) receive a query relating to the data set; and
   (f) provide a response to the query based at least in part on the model.

28. The computer-accessible medium of claim 26, wherein the set of instructions is further configured to program the processing arrangement to re-organize the data set into a plurality of further states and a plurality of further state transitions based at least in part on the at least one probability assigned to the at least one state, wherein at least one further transition of the plurality of further state transitions is associated with each of the further states.

29. The computer-accessible medium of claim 26, wherein the set of instructions is configured to program the processing arrangement to organize the data set using at least one of a clustering procedure, a K-means procedure, an SOM procedure, an agglomerative procedure, a graph-based procedure, a biclustering procedure, or an information-bottleneck-based procedure.

30. The computer-accessible medium of claim 26, wherein the at least one invariant is determined by combining at least two labels.

31. The computer-accessible medium of claim 30, further comprising combining at lest two labels using at least one of a model checking technique or an iterative extension technique.

32. The computer-accessible medium of claim 26, wherein the set of instructions is further configured to program the processing arrangement to at least one of display or store information related to the model in a storage arrangement in at least one of a user-accessible format or a user-readable format.

33. The computer-accessible medium of claim 26, wherein at least one of the states or the state transitions comprise at least one of a time factor or a temporal component.

* * * * *